United States Patent
Chiang

(10) Patent No.: US 11,435,561 B2
(45) Date of Patent: Sep. 6, 2022

(54) LENS SYSTEM AND IMAGE PHOTOGRAPHING APPARATUS AND DEVICE

(71) Applicant: HUAWEI TECHNOLOGIES CO., LTD., Guangdong (CN)

(72) Inventor: Yita Chiang, Dongguan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 229 days.

(21) Appl. No.: 16/805,020

(22) Filed: Feb. 28, 2020

(65) Prior Publication Data

US 2020/0201003 A1 Jun. 25, 2020

Related U.S. Application Data

(63) Continuation of application No. PCT/CN2018/081961, filed on Apr. 4, 2018.

(30) Foreign Application Priority Data

Aug. 30, 2017 (CN) .......................... 201710766218.1

(51) Int. Cl.
- *G02B 13/02* (2006.01)
- *G02B 9/60* (2006.01)
- *G02B 15/14* (2006.01)
- *G02B 13/00* (2006.01)

(52) U.S. Cl.
CPC .............. *G02B 13/02* (2013.01); *G02B 9/60* (2013.01); *G02B 13/009* (2013.01); *G02B 13/0045* (2013.01); *G02B 15/145109* (2019.08)

(58) Field of Classification Search
USPC .................................................. 359/745, 746
See application file for complete search history.

(56) References Cited

U.S. PATENT DOCUMENTS

| | | | |
|---|---|---|---|
| 2,445,594 A | 7/1948 | Bennett | |
| 9,223,118 B2 * | 12/2015 | Mercado | H04N 5/2253 |
| 10,095,007 B1 * | 10/2018 | Jhang | G02B 9/62 |
| 2012/0314301 A1 * | 12/2012 | Huang | G02B 13/0045 |
| | | | 359/713 |

(Continued)

FOREIGN PATENT DOCUMENTS

| CN | 204143050 U | 2/2015 |
|---|---|---|
| CN | 104597586 A | 5/2015 |

(Continued)

*Primary Examiner* — Darryl J Collins
(74) *Attorney, Agent, or Firm* — Womble Bond Dickinson (US) LLP

(57) ABSTRACT

This application relates to the field of optical imaging technologies, and discloses a lens system and an image photographing apparatus and device, so as to obtain a larger image on an imaging surface, thereby facilitating product miniaturization. The lens system includes a first lens, a second lens, a third lens, a fourth lens, and a fifth lens that are sequentially arranged in an optic axis direction from an object side to an image side, where the first lens has a positive refractive power, the second lens has a negative refractive power, the third lens has a negative refractive power, the fourth lens has a positive refractive power, and the fifth lens has a negative refractive power and has a convex image-side surface.

12 Claims, 8 Drawing Sheets

(56) References Cited

U.S. PATENT DOCUMENTS

| | | |
|---|---|---|
| 2013/0057968 A1 | 3/2013 | Tang et al. |
| 2013/0100545 A1 | 4/2013 | Jo |
| 2013/0194678 A1 | 8/2013 | Suzuki et al. |
| 2015/0042863 A1* | 2/2015 | Tsai ................. G02B 3/04 348/335 |
| 2015/0116569 A1 | 4/2015 | Mercado |
| 2015/0177495 A1* | 6/2015 | Kanda ............... G02B 13/0045 359/764 |
| 2015/0244942 A1 | 8/2015 | Shabtay et al. |
| 2016/0216485 A1* | 7/2016 | Chen ................. G02B 13/0045 |
| 2018/0059376 A1* | 3/2018 | Lin ..................... G02B 13/02 |
| 2018/0081152 A1 | 3/2018 | Dai et al. |
| 2018/0321471 A1* | 11/2018 | Chen ................. G02B 13/0045 |
| 2019/0056570 A1* | 2/2019 | Yeh ................... G02B 13/0045 |
| 2020/0241247 A1* | 7/2020 | Zhang ............... G02B 27/0025 |

FOREIGN PATENT DOCUMENTS

| | | |
|---|---|---|
| CN | 204462516 U | 7/2015 |
| CN | 105359006 A | 2/2016 |
| CN | 105988186 A | 10/2016 |
| CN | 106990508 A | 7/2017 |
| CN | 107608053 A | 1/2018 |
| DE | 481830 C | 8/1929 |
| JP | 2013156579 A | 8/2013 |
| WO | 2015001440 A1 | 1/2015 |

* cited by examiner

LENS SYSTEM AND IMAGE PHOTOGRAPHING APPARATUS AND DEVICE

CROSS-REFERENCE TO RELATED APPLICATIONS

This application is a continuation of International Application No. PCT/CN2018/081961 filed on Apr. 4, 2018, which claims priority to Chinese Patent Application No.201710766218.1, filed on Aug. 30, 2017. The disclosures of the aforementioned applications are hereby incorporated by reference in their entireties.

TECHNICAL FIELD

The present application relates to the field of optical imaging technologies, and in particular, to a lens system that is used to form an optical image of an object, on an image sensor such as a CCD (charge-coupled device) or a CMOS (complementary metal-oxide-semiconductor); an image photographing apparatus disposed with the lens system to perform image photographing, such as a camera; and an image photographing device such as a digital camera, a mobile phone equipped with a camera, a personal digital assistant (PDA), or a smartphone.

BACKGROUND

Recently, with expansion of personal computers to families and the like, digital cameras that can input, into the personal computers, image information obtained by imaging scenery, a person, or the like have been rapidly expanded. In addition, a growing quantity of mobile phones and smartphones are equipped with built-in camera modules used for image inputting. An image sensor, such as a CCD or a CMOS, is used for such an apparatus having an image photographing capability. Recently, sizes of such types of image sensors have been greatly reduced, and therefore an entire image photographing apparatus and a lens system to be installed on the apparatus are also required to have more compact sizes. In addition, a quantity of pixels of the image sensor has been increased. This results in constantly increasing requirements on improving a resolution and performance of the lens system.

For such a lens system, miniaturization is always implemented by reducing a quantity of lenses, for example, to four, or further, to three. For a lens system that is used for implementing a high-resolution capability, in a known solution, optical performance is improved by increasing a quantity of lenses. For example, FIG. 1 provides a lens system that has a telephoto function, and the lens system can simulate 2× optical zoom without damaging image quality. The lens system includes a first lens, a second lens, a third lens, a fourth lens, and a fifth lens that are sequentially disposed in an optic axis direction from an object side to an image side. The fifth lens in the lens system of such a structure is a lens having a positive refractive power. When a focal length is 12 mm for equal-ratio zooming in by using the lens system, a diameter of the fifth lens needs to be greater than 7 mm. This is unhelpful for product miniaturization.

SUMMARY

Embodiments of the present invention provide a lens system and an image photographing apparatus and device, so as to obtain a larger image on an imaging surface, thereby facilitating product miniaturization.

According to a first aspect, a lens system is provided, including a first lens, a second lens, a third lens, a fourth lens, and a fifth lens that are sequentially arranged in an optic axis direction from an object side to an image side, where the first lens has a positive refractive power, the second lens has a negative refractive power, the third lens has a negative refractive power, the fourth lens has a positive refractive power, and the fifth lens has a negative refractive power and has a convex image-side surface. In the prior approaches, a fifth lens is a lens having a positive refractive power, and a function thereof is to converge light rays. A longer focal length for equal-ratio zooming in on an image side of the fifth lens indicates a smaller image on an imaging surface. This is unhelpful for image quality improvement. To obtain a larger image, a lens having a larger diameter size needs to be used. This is unhelpful for product miniaturization. In this solution, because the fifth lens has the negative refractive power and has the convex image-side surface, a function thereof is to diverge light rays. A longer focal length for equal-ratio zooming in on an image side of the fifth lens indicates a larger image on an imaging surface. Therefore, an image whose size is the same as or greater than that of an image in the prior approach can be obtained on the imaging surface by using the fifth lens having a smaller size. This helps reduce a product size in a direction perpendicular to the optic axis, thereby facilitating product miniaturization.

In an example solution, the lens system has an effective focal length f within a range from 11.0 mm to 13.00 mm, the lens system has a total track length TTL within a range from 8.0 mm to 12.00 mm, and the lens system has a telephoto ratio TTL/f within a range from 0.74 to 1.0.

An example solution is as follows: The first lens has a convex object-side surface, and has a function of converging light rays; the second lens has a convex image-side surface and has a concave object-side surface, and has a function of correcting a color difference caused by light rays that have different wavelengths and that enter the lens system; the third lens has a concave image-side surface, and has a function of expanding light rays; and the fourth lens has a convex image-side surface, and has a function of re-correcting the color difference caused by the light rays that have different wavelengths and that enter the lens system.

An example solution is as follows: A curvature radius of an edge region and a curvature radius of a non-edge region on the object-side surface of the second lens are different, and the curvature radius of the edge region on the object-side surface of the second lens is negative, that is, an edge of the object-side surface of the second lens bends to the object side. A function of the second lens is to correct an aberration of light rays at the edge. In another example solution, a curvature radius of an edge region and a curvature radius of a non-edge region on the object-side surface of the second lens are different, and the curvature radius of the edge region on the object-side surface of the second lens is positive, that is, an edge of the object-side surface of the second lens bends to the image side. A function of the second lens is to correct a field curvature and a distortion of light rays that enter the lens system.

An example solution is as follows: The first lens has a convex object-side surface or a flat object-side surface and has a positive focal length, and the first lens satisfies the following conditions:

$0.3 < f1/f < 0.6$, and $-1.0 < R1/R2 < 0$, where $f1$ indicates the focal length of the first lens, R1 indicates a vertex curvature radius of the object-side surface of the first lens, and R2 indicates a vertex curvature radius of an image-side surface of the first lens;

the second lens, the third lens, and the fifth lens have negative focal lengths, and satisfy the following conditions:
  −0.8<f2/f<−0.1, and −100<R3/R4<100;
  −0.8<f3/f<−0.1, and −100<R5/R6<100; and
  −0.8<f5/f<−0.1, and −0.1<R9/R10<10, where f2 indicates the focal length of the second lens, f3 indicates the focal length of the third lens, f5 indicates the focal length of the fifth lens, R3 indicates a vertex curvature radius of the object-side surface of the second lens, R4 indicates a vertex curvature radius of the image-side surface of the second lens, R5 indicates a vertex curvature radius of an object-side surface of the third lens, R6 indicates a vertex curvature radius of the image-side surface of the third lens, R9 indicates a vertex curvature radius of an object-side surface of the fifth lens, and R10 indicates a vertex curvature radius of the image-side surface of the fifth lens; and the fourth lens has a positive focal length, and satisfies the following conditions:
  0.4<f4/f<2.0, and O<R7/R8<20, where f4 indicates the focal length of the fourth lens, R7 indicates a vertex curvature radius of an object-side surface of the fourth lens, and R8 indicates a vertex curvature radius of the image-side surface of the fourth lens.

In addition, the third lens and the fifth lens are made of materials having a first abbe coefficient, and the first lens, the second lens, and the fifth lens are made of materials having a second abbe coefficient. The foregoing materials may be transparent materials such as plastics or glass.

An example solution is as follows: The first lens has a convex object-side surface, and has a function of converging light rays; the second lens has a concave image-side surface, and has a function of correcting a color difference caused by light rays that have different wavelengths and that enter the lens system; the third lens has a concave image-side surface, and has a function of expanding light rays; and the fourth lens has a convex image-side surface, and has a function of re-correcting the color difference caused by the light rays that have different wavelengths and that enter the lens system.

An example solution is as follows: A curvature radius of an edge region and a curvature radius of a non-edge region on the image-side surface of the third lens are different, and the curvature radius of the edge region on the image-side surface of the third lens is negative, that is, an edge of the image-side surface of the third lens bends to the object side. A function of the third lens is to correct a field curvature and a distortion of light rays that enter the lens system.

An example solution is as follows: The first lens has a convex object-side surface or a flat object-side surface and has a positive focal length, and the first lens satisfies the following conditions:
  0.3<f1/f<0.6, and −1.0<R1/R2<0, where f1 indicates the focal length of the first lens, R1 indicates a vertex curvature radius of the object-side surface of the first lens, and R2 indicates a vertex curvature radius of an image-side surface of the first lens;

the second lens, the third lens, and the fifth lens have negative focal lengths, and satisfy the following conditions:
  −0.8<f2/f<−0.1, and −100<R3/R4<100;
  −0.8<f3/f<−0.1, and −100<R5/R6<100; and
  −0.8<f5/f<−0.1, and −0.1<R9/R10<10, where f2 indicates the focal length of the second lens, f3 indicates the focal length of the third lens, f5 indicates the focal length of the fifth lens, R3 indicates a vertex curvature radius of an object-side surface of the second lens, R4 indicates a vertex curvature radius of the image-side surface of the second lens, R5 indicates a vertex curvature radius of an object-side surface of the third lens, R6 indicates a vertex curvature radius of the image-side surface of the third lens, R9 indicates a vertex curvature radius of an object-side surface of the fifth lens, and R10 indicates a vertex curvature radius of the image-side surface of the fifth lens; and the fourth lens has a positive focal length, and satisfies the following conditions:
  0.4<f4/f<0.8, and 0<R7/R8<20, where f4 indicates the focal length of the fourth lens, R7 indicates a vertex curvature radius of an object-side surface of the fourth lens, and R8 indicates a vertex curvature radius of the image-side surface of the fourth lens.

In addition, the first lens and the third lens are made of materials having a first abbe coefficient, and the second lens, the fourth lens, and the fifth lens are made of materials having a second abbe coefficient. The foregoing materials may be transparent materials such as plastics or glass.

An example solution is as follows: A field of view of the lens system is less than or equal to 25°.

According to a second aspect, an image photographing apparatus is provided, including:
  a photoreceptor, configured to capture light projected onto a surface of the photoreceptor; and
  a lens system, configured to refract light that comes from an object field located in front of the image photographing apparatus, to form an image of a scene on an imaging plane that is located on the surface of the photoreceptor, where the lens system includes a plurality of refraction-type lenses arranged in an optic axis, and the lens system is any one of the lens systems described above. This solution includes technical features that are the same as or corresponding to those of the lens system provided in the first solution. Therefore, for a resolved technical problem and implemented technical effects, reference may be made to the beneficial effects of the lens system provided in the first aspect and the corresponding solutions in the specific implementations of the first aspect, and details are not described herein again.

An example solution is as follows: The image photographing apparatus further includes an aperture stop on an object side of the first lens located on an object side on the optic axis of the lens system, and the aperture stop provides a focal ratio within a range from 2.4 to 10 after being adjusted.

According to a third aspect, an image photographing device is provided, including a processor, a memory, and an image photographing apparatus, where the processor, the memory, and the image photographing apparatus are coupled and connected through a bus; the memory includes an instruction that can be executed by the processor to control an operation of the image photographing apparatus; and the image photographing apparatus is any one of the foregoing image photographing apparatuses. This solution includes technical features that are the same as or corresponding to those of the lens system provided in the first solution. Therefore, for a resolved technical problem and implemented technical effects, reference may be made to the beneficial effects of the lens system provided in the first aspect and the corresponding solutions in the specific implementations of the first aspect, and details are not described herein again.

BRIEF DESCRIPTION OF DRAWINGS

To describe the technical solutions in the embodiments of the present invention or in the prior art more clearly, the following briefly describes the accompanying drawings required for describing the embodiments.

DESCRIPTION OF EMBODIMENTS

The following clearly describes the technical solutions in the embodiments of the present invention with reference to the accompanying drawings in the embodiments of the present invention.

An embodiment of this application provides an image photographing apparatus that includes a photoreceptor and a lens system. An embodiment of this application provides a lens system that includes five lenses. The lens system may be used in an image photographing apparatus; and compared with a conventional lens system, can obtain a larger image on an imaging surface, thereby facilitating product miniaturization. In this way, embodiments of the image photographing apparatus (which may be a camera) are applicable to small-sized and/or mobile multipurpose devices such as a cellular phone, a smartphone, a panel-shaped or tablet computing device, a palmtop computer, a netbook, a notebook computer, a subnotebook, and an ultrabook computer. However, it should be noted that all aspects (for example, the lens system and the photoreceptor) of the camera may be proportionally enlarged or reduced to provide an image photographing apparatus having a larger or smaller product size. In addition, the image photographing apparatus may be implemented as an independent digital camera. In addition to an application of a static (single-frame capturing) camera, the image photographing apparatus may be further applicable to an application of a video camera.

In the following solutions, each lens has two surfaces, where a surface located on a side of a photoreceptor is referred to as an "image-side surface" or an "image-party surface", and a surface located on a side of a photographed object in an object field is referred to as an "object-side surface" or an "object-party surface". For a lens system including lenses, in an optic axis direction, a side at the photoreceptor is referred to as an "image side" or an "image party", and a side at the photographed object in the object field is referred to as an "object side" or an "object party".

Figure 1:
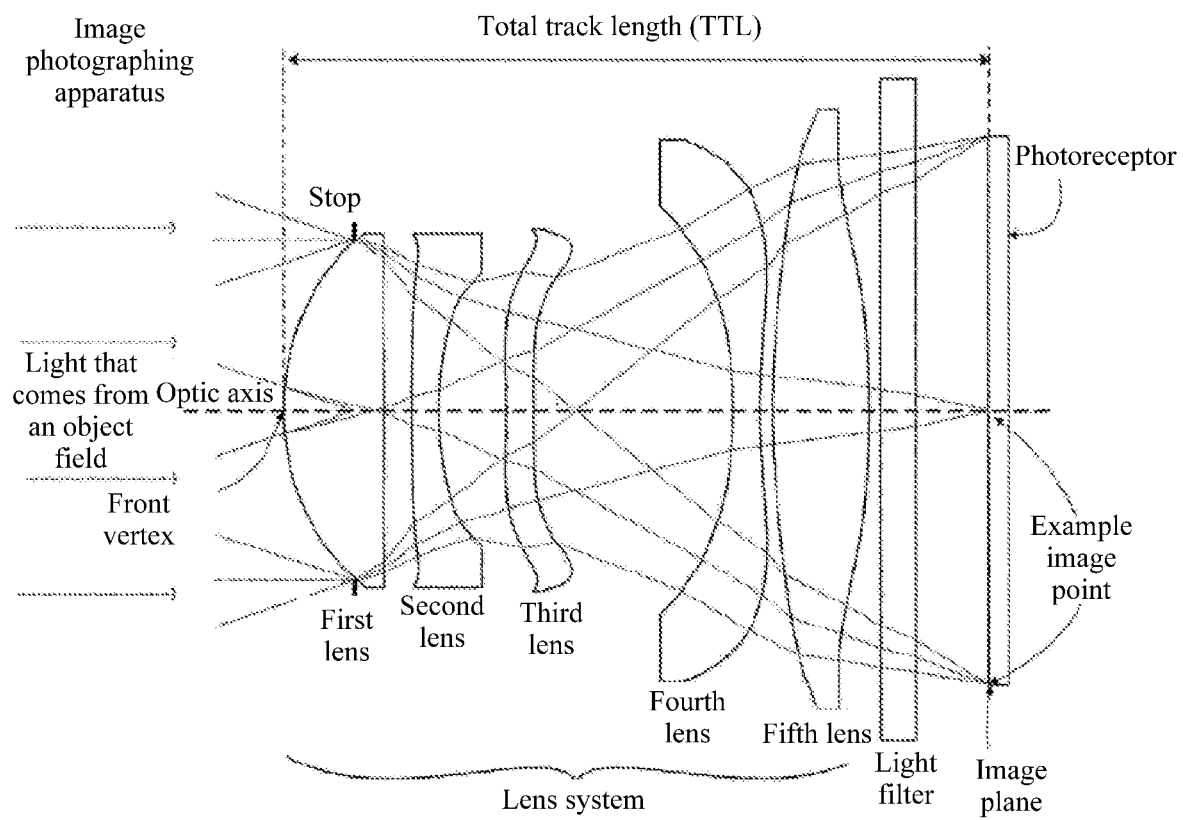
FIG. 1 is a schematic structural diagram of an image photographing apparatus.
Figure 2:
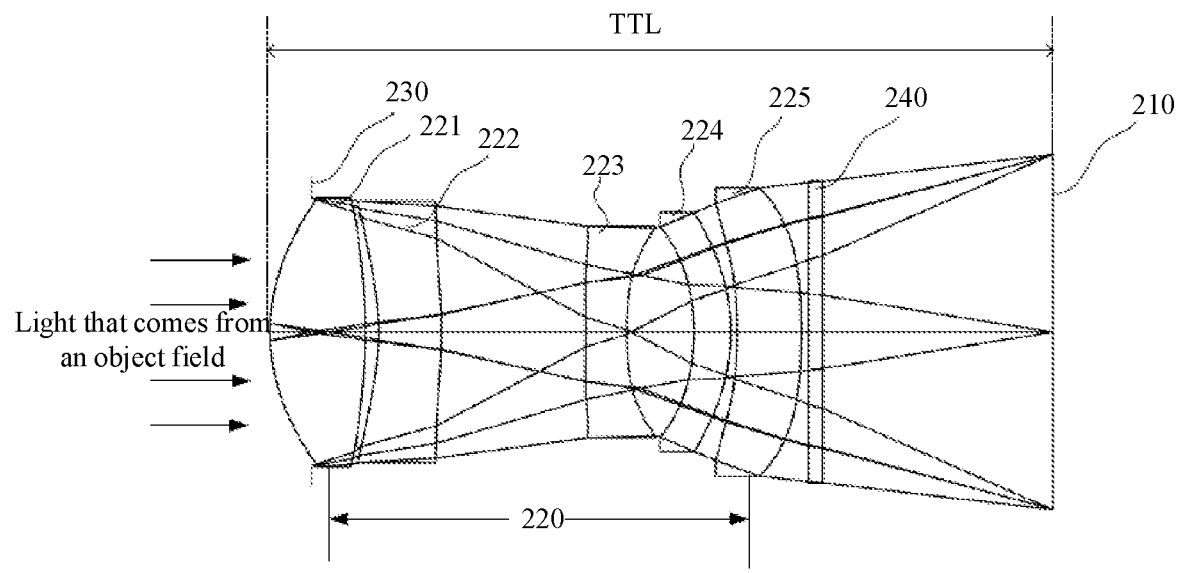
FIG. 2 is a schematic structural diagram of an image photographing apparatus according to an embodiment of this application.

Specifically, as shown in FIG. 2, an embodiment of this application provides an image photographing apparatus 20, including: a photoreceptor 210, configured to capture light projected onto a surface of the photoreceptor; and a lens system 220, configured to refract light that comes from an object field located in front of the image photographing apparatus, to form an image of a scene on an imaging plane that is located on the surface of the photoreceptor 210. The lens system 220 includes a plurality of refraction-type lenses arranged in an optic axis.

Figure 6:
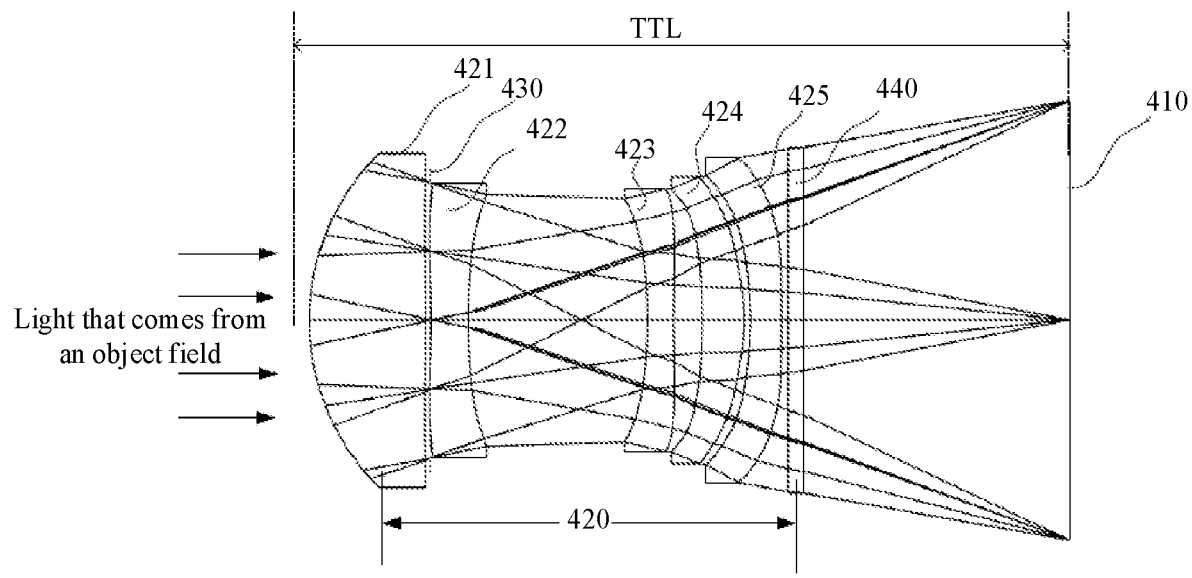
FIG. 6 is a schematic structural diagram of an image photographing apparatus according to an embodiment of this application.

For example, the photoreceptor 210 may be a technical chip, of one or more integrated circuits (IC), implemented according to any one of various photoreceptor technologies. For example, the photoreceptor may be a chip that uses a CCD technology or a CMOS technology. In addition, the image photographing apparatus 20 may further include an aperture stop (AS) 230 located on an object side of the first lens (that is, a first lens 221) on an object side on the optic axis of the lens system. Alternatively, the aperture stop may be located at another location in the lens system. For example, as shown in FIG. 6, an aperture stop 430 is located between the first lens (that is, a first lens 421) and the second lens (that is, a second lens 422) on an optic axis of a lens system.

The image photographing apparatus 20 may further include a light filter 240 located on an image side of the first lens (that is, a fifth lens 225) on an image side on the optic axis of the lens system 220. The light filter 240 is located between the photoreceptor 210 and the fifth lens 225. For example, the light filter 240 is an infrared filter. The light filter 240 may be made of, for example, a glass material, and certainly, may be alternatively made of another transparent material. The light filter 240 can block infrared radiation that may damage the photoreceptor or may have adverse impact on the photoreceptor. The light filter 240 does not affect an effective focal length f of the lens system. Moreover, the image photographing apparatus 20 may further include components other than the components shown in the figures and described in this specification.

In the image photographing apparatus 20, the lens system 220 forms an image on the surface of the photoreceptor 210 or on an imaging plane (IP) located on the surface of the photoreceptor 210. An image size of a remote object is directly proportional to the effective focal length f of the lens system 220. A total track length (TTL) of the lens system 220 is a distance that is between a front vertex on an object-side surface of the first lens 221 and the imaging plane and that is on the optic axis (AX). For the lens system 220, the TTL is less than the effective focal length (f) of the lens system, and a ratio of the total track length TTL to the focal length (TTL/f) is a telephoto ratio. The lens system with a telephoto function has a TTF/f that is less than or equal to 1.

In at least some embodiments, the lens system 220 may be a fixed telephoto lens system, and is configured to make the effective focal length f of the lens system be within a range from 11.0 mm to 13.00 mm, make an F value (a focal ratio or f/#) be within a range from about 2.4 to about 10.0, make a field of view (FOV) be less than or equal to 25° (certainly, the FOV may alternatively be narrower or wider), and make the TTL of the lens system 220 be within a range from 8.0 mm to 12.00 mm. The telephoto ratio (TTL/f) of the lens system 220 satisfies the following relationship: 0.74<TTL/f<1.0.

In an embodiment provided in this application, the lens system 220 may be configured to make the effective focal length f of the lens system 220 be 12.0 mm at a reference wavelength of 555 nm, and make a value of the focal ratio F be 2.6. The lens system may be configured to, for example, have a focal length f of 12.0 mm and an F value of 2.6, to meet constraints on optical, imaging, and/or product size conditions that are set for specific applications of the image photographing apparatus 20. It should be noted that the focal ratio is also referred to as f/# or the F value, and the F value is defined by f/D, where D indicates a diameter of an entrance pupil, that is, an effective aperture formed by the aperture stop 230. However, it should be noted that the focal length f, the F value, and/or other parameters may be proportionally reduced or increased or adjusted, to meet various specifications for constraints on optical, imaging, and/or product size conditions of other applications of the image photographing apparatus 20.

In some embodiments, the lens system 220 may be adjustable. For example, in some embodiments, the telephoto lens system provided in this application may be equipped with an adjustable aperture stop. The F value (the focal ratio or f/#) may be dynamically changed within a specific range by using the adjustable aperture stop. For example, if the lens system is well corrected to f/2.8 and a given focal length f and FOV, the focal ratio may be changed within a range from 2.8 to 10 (or higher) by adjusting the aperture stop. In some embodiments, the lens system may be used under a lower focal ratio (f/#<2.8) by adjusting the aperture stop.

Referring to the embodiment shown in FIG. 2, the lens system 220 includes the first lens 221, a second lens 222, a third lens 223, a fourth lens 224, and the fifth lens 225 that are sequentially arranged in an optic axis direction from the object side to an image side. The first lens 221 has a positive refractive power, the second lens 222 has a negative refractive power, the third lens 223 has a negative refractive power, and the fourth lens 224 has a positive refractive power.

The fifth lens 225 has a negative refractive power and has a convex image-side surface. The lens system has an effective focal length f within a range from 11.0 mm to 13.00 mm, the lens system has a total track length TTL within a range from 8.0 mm to 12.00 mm, and the lens system has a telephoto ratio TTL/f within a range from 0.74 to 1.0.

In the example in FIG. 2, a sectional view of the image photographing apparatus 20 including the lens system 220 is provided. The lens system 220 includes the five lens elements (221 to 225) that have refractive powers. In FIG. 2, the aperture stop 230, the first lens 221 that has the positive refractive power and has the convex object-side surface, the second lens 222 that has the negative refractive power, a convex image-side surface, and a concave object-side surface, the third lens 223 that has the negative refractive power and has a concave image-side surface, the fourth lens 224 that has the positive refractive power and has a convex image-side surface, the fifth lens 225 that has the negative refractive power and has the convex image-side surface, and the imaging plane formed by the lens system 220 on the surface of the photoreceptor 210 are arranged in the optic axis AX of the image photographing apparatus 20 from the object side to the image side (from left to right in FIG. 2). In some embodiments, the light filter 240 is included between the fifth lens 225 and the photoreceptor 210. The first lens 221 has the positive refractive power and has the convex object-side surface, and the first lens 221 has a function of converging light rays. The second lens 222 has the negative refractive power, the convex image-side surface, and the concave object-side surface, and the second lens 222 has a function of correcting a color difference caused by light rays that have different wavelengths and that enter the lens system. The third lens 223 has the negative refractive power and has the concave image-side surface, and the third lens 223 has a function of expanding light rays. The fourth lens 224 has the positive refractive power and has the convex image-side surface, and the fourth lens 224 has a function of re-correcting the color difference caused by the light rays that have different wavelengths and that enter the lens system. A curvature radius of an edge region and a curvature radius of a non-edge region on the object-side surface of the second lens 222 are different, and the curvature radius of the edge region on the object-side surface of the second lens 222 is negative, that is, an edge of the object-side surface of the second lens 222 bends to the object side. A function of the second lens 222 is to correct a phase difference of light rays at the edge.

The first lens 221 has a convex object-side surface or a flat object-side surface, and has a positive focal length. The first lens 221 satisfies the following conditions: $0.3<f1/f<0.6$, and $-1.0<R1/R2<0$, where f1 indicates the focal length of the first lens, R1 indicates a vertex curvature radius of the object-side surface of the first lens, and R2 indicates a vertex curvature radius of an image-side surface of the first lens.

The second lens 222, the third lens 223, and the fifth lens 225 have negative focal lengths, and satisfy the following conditions: $-0.8<f2/f<-0.1$, and $-100<R3/R4<100$;

$-0.8<f3/f<-0.1$, and $-100<R5/R6<100$; and $-0.8<f5/f<-0.1$, and $-0.1<R9/R10<10$, where f2 indicates the focal length of the second lens, f3 indicates the focal length of the third lens, f5 indicates the focal length of the fifth lens, R3 indicates a vertex curvature radius of the object-side surface of the second lens, R4 indicates a vertex curvature radius of the image-side surface of the second lens, R5 indicates a vertex curvature radius of an object-side surface of the third lens, R6 indicates a vertex curvature radius of the image-side surface of the third lens, R9 indicates a vertex curvature radius of an object-side surface of the fifth lens, and R10 indicates a vertex curvature radius of the image-side surface of the fifth lens.

The fourth lens 224 has a positive focal length, and satisfies the following conditions:

$0.4<f4/f<2.0$, and $0<R7/R8<20$, where f4 indicates the focal length of the fourth lens, R7 indicates a vertex curvature radius of an object-side surface of the fourth lens, and R8 indicates a vertex curvature radius of the image-side surface of the fourth lens.

In addition, the third lens and the fifth lens are made of materials having a first abbe coefficient, and the first lens, the second lens, and the fifth lens are made of materials having a second abbe coefficient. The foregoing materials may be transparent materials such as plastics or glass.

Table 1A to Table 1C provide example values of various optical and physical parameters of example embodiments of the image photographing apparatus 20 and the lens system 220 shown in FIG. 2. Referring to Table 1A to Table 1C, embodiments of the lens system 220 cover applications in a visible light region of an optical spectrum from 470 nanometers (nm) to 650 nm.

Table 1A shows basic parameters of the lens system 220. Table 1B shows basic parameters of each component in the lens system 220. Table 1C shows curvature radii and aspheric coefficients of surfaces of all the lenses in the lens system 220. Surfaces S0 to S14 in Table 1B and Table 1C respectively indicate: an object plane S0, an aperture grating S1, the object-side surface S2 of the first lens 221, the image-side surface S3 of the first lens 221, the object-side surface S4 of the second lens 222, the image-side surface S5 of the second lens 222, the object-side surface S6 of the third lens 223, the image-side surface S7 of the third lens 223, the object-side surface S8 of the fourth lens 224, the image-side surface S9 of the fourth lens 224, the object-side surface S10 of the fifth lens 225, the image-side surface S11 of the fifth lens 225, an object-side surface S12 of the light filter, an image-side surface S13 of the light filter, and the imaging plane S14. Table 1B includes the following parameters of all the components: curvature radii R (which may be specific values or may be INF (infinite)), shapes (flat and ASP (aspheric)), thicknesses or intervals, refractive indexes Nd, and abbe numbers Vd. Table 1C includes curvature radii R and aspheric coefficients K, A, B, C, and D of the surfaces of the lenses.

Figure 3:
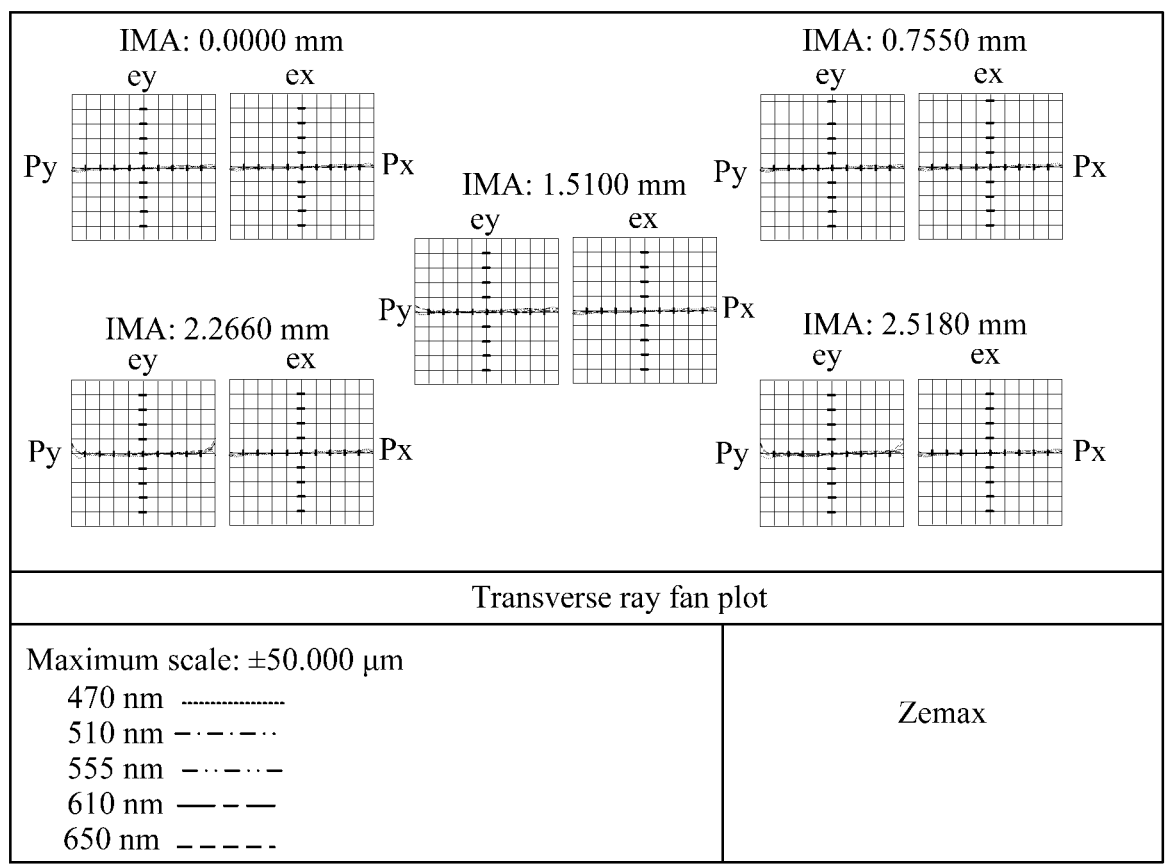
FIG. 3 is a line graph of polychromatic light ray aberrations, of a lens system shown in FIG. 2, in a half field of view and in a visible spectral band with a range from 470 nm to 650 nm.

The lens system 220 and the parameters provided in Table 1A to Table 1C can effectively correct optical aberrations. FIG. 3 shows a line graph of polychromatic light ray aberrations, of the lens system 220 described in FIG. 2 and Table 1A to Table 1C, in a half field of view (HFOV, 12.5 degrees) and in a visible spectral band with a range from 470 nm to 650 nm. FIG. 3 is a transverse ray fan plot output by using Zemax emulation, and shows curves of polychromatic light ray aberrations, where Px/Py indicates a normalized coordinate of a pupil, ex/ey indicates a position difference of a light ray on an imaging plane, and a maximum/minimum value of ex/ey is (Maximum scale+/−50 μm). FIG. 3 separately shows aberration curves of light rays of five wavelengths (470 nm, 510 nm, 555 nm, 610 nm, and 610 nm) respectively on IMAs (imaging plane, imaging plane)= 0.0000 mm, 0.7550 mm, 1.5100 mm, 2.2650 mm, and 2.5180 mm. A smaller position difference on the imaging plane ex/ey indicates better optical performance of the lens system. In the lens system provided in this application, the position difference on the imaging plane ex/ey is controlled within 10 μm.

TABLE 1A

| | |
|---|---|
| Focal length f | 12 mm |
| F value | 2.6 |
| Half FOV | 12.5° |
| Total track length TTL | 10.5 mm |
| Telephoto ratio TTL/f | 0.875 |
| Designed wavelength | 650 nm, 610 nm, 555 nm, 510 nm, 470 nm |

TABLE 1B

| Element | Surface (S#) | Curvature radius R | Shape | Thickness or interval | Material | Refractive index Nd | Abbe number Vd |
|---|---|---|---|---|---|---|---|
| Object plane | 0 | INF | Flat | INF | | | |
| Aperture grating | 1 | INF | Flat | −0.647 | | | |
| First lens | 2 | 3.5 | ASP | 1.392 | Plastic | 1.5445 | 55.987 |
| | 3 | −8.7 | ASP | 0.199 | | | |
| Second lens | 4 | −4.0 | ASP | 0.913 | Plastic | 1.651 | 21.514 |
| | 5 | −8.2 | ASP | 2.117 | | | |
| Third lens | 6 | −13.3 | ASP | 0.592 | Plastic | 1.5445 | 55.987 |
| | 7 | 10.3 | ASP | 0.985 | | | |
| Fourth lens | 8 | −3.6 | ASP | 0.535 | Plastic | 1.651 | 21.514 |
| | 9 | −3.7 | ASP | 0.097 | | | |
| Fifth lens | 10 | −7.5 | ASP | 0.938 | Plastic | 1.5445 | 55.987 |
| | 11 | −11.1 | ASP | 0.1 | | | |
| Light filter | 12 | INF | Flat | 0.21 | Glass | | |
| | 13 | INF | Flat | 3.072 | | | |
| Imaging plane | 14 | INF | Flat | | | | |

TABLE 1C

| S# | Radius (R) | K | A | B | C | D |
|---|---|---|---|---|---|---|
| 2 | 3.5 | −0.5183718290219 | 0.000645357 | −0.00029483 | 5.49948E−05 | −1.12277E−05 |
| 3 | −8.7 | −69.28160396529 | −0.001843687 | 0.000692963 | −0.000305642 | 2.69035E−05 |
| 4 | −4.0 | −13.5515155313 | 0.005218305 | −0.000201498 | −0.000212351 | 2.3109E−05 |
| 5 | −8.2 | −44.6216377294299 | 0.011125775 | −0.001325862 | −1.92571E−05 | −1.80032E−06 |
| 6 | −13.3 | −100.0316086065 | 0.048584858 | −0.019027247 | 0.003977575 | −0.000611011 |
| 7 | 10.3 | 8.986958724834 | 0.066648754 | −0.018183559 | 0.004025427 | −0.000594704 |
| 8 | −3.6 | −3.078803714048 | −0.008771879 | −0.004733329 | 0.000700767 | −1.59353E−05 |
| 9 | −3.7 | 0.8984316967218 | −0.00206329 | 0.000799001 | 0.000105887 | 4.00495E−05 |
| 10 | −7.5 | −32.62718992356 | −0.021473645 | 0.005307631 | −0.000372303 | −1.04086E−05 |
| 11 | −11.1 | 7.599381520156 | −0.012026771 | 0.000174529 | 6.60397E−05 | −1.95207E−05 |

The aspheric coefficients of the lens surfaces in the lens system in the example are listed in Table 1C. The TTL of the lens system can be reduced (for example, reduced to 10.2 mm, as described in Table 2A to Table 2C below) by configuring the lens system based on distribution of the refractive powers of the lenses, and by adjusting the curvature radii and the aspheric coefficients based on the parameters described in Table 1A to Table 1C. Moreover, a surface that is of the fifth lens and that bulges towards the image side diffuses light rays to the imaging surface. Compared with that in prior approaches, the lens system in this application can effectively reduce height and width sizes of the lens system by 30%, and can effectively correct aberrations of the system. An aberration curve shows that the lens system can obtain optical performance of high image quality resolution. In prior approaches, because both a fourth lens and a fifth lens use a design in which a difference between a middle thickness and an edge thickness is relatively large, flare reflection is easily generated at an edge of the fourth lens; in addition, this is adverse to injection molding when the lens is prepared by using a plastic. By contrast, in the solution provided in this embodiment of this application, both the fourth lens and the fifth lens are shaped like half moons, thereby effectively reducing differences between middle thicknesses and edge thicknesses of the fourth lens and the fifth lens, and preventing the fourth lens from affecting image quality due to flare reflection. In addition, for lenses formed based on the foregoing parameters, injection molding by using a plastic material is better facilitated.

In prior approaches, the fifth lens is a lens having a positive refractive power, and a function thereof is to converge light rays. A longer focal length for equal-ratio zooming in on an image side of the fifth lens indicates a smaller image on an imaging surface. This is unhelpful for image quality improvement. To obtain a larger image, a lens having a larger diameter size needs to be used. This is unhelpful for product miniaturization. In this solution, because the fifth lens has the negative refractive power and has the convex image-side surface, a function thereof is to diverge light rays. A longer focal length for equal-ratio zooming in on the image side of the fifth lens indicates a larger image on the imaging surface. Therefore, an image whose size is the same as or greater than that of an image in prior approaches can be obtained on the imaging surface by using the fifth lens having a smaller size. This helps reduce a product size in a direction perpendicular to the optic axis, thereby facilitating product miniaturization.

Figure 4:
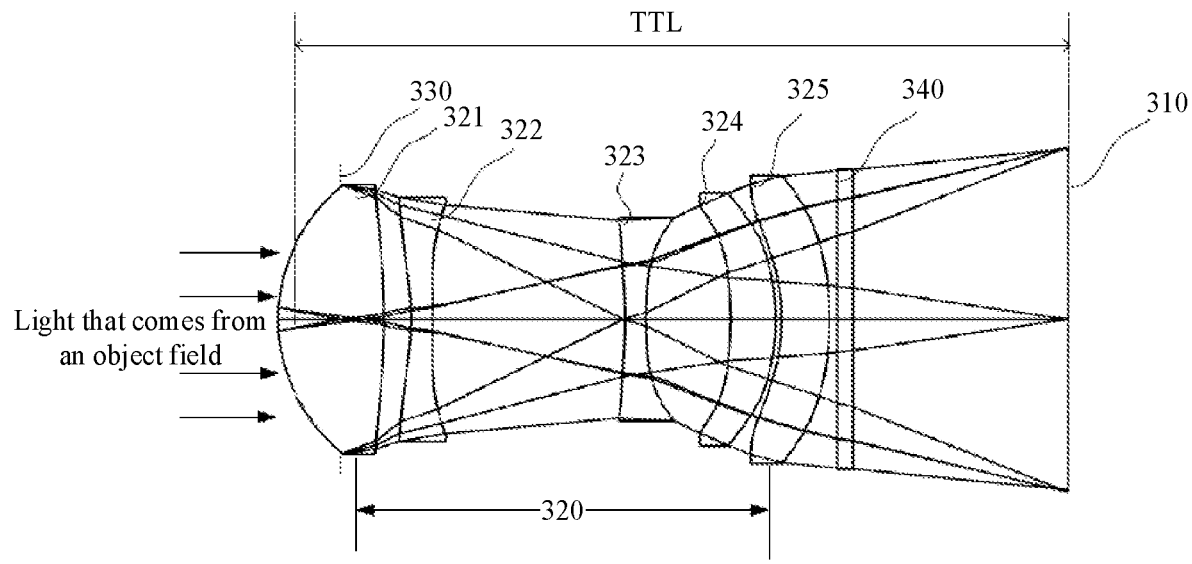
FIG. 4 is a schematic structural diagram of an image photographing apparatus according to an embodiment of this application.

In an example in FIG. 4, a sectional view of an image photographing apparatus 30 including a lens system 320 is provided. The lens system 320 includes five lens elements (321 to 325) that have refractive powers. In FIG. 4, an aperture stop 330, a first lens 321 that has a positive refractive power and has a convex object-side surface, a second lens 322 that has a negative refractive power, a convex image-side surface, and a concave object-side surface, a third lens 323 that has a negative refractive power and has a concave image-side surface, a fourth lens 324 that has a positive refractive power and has a convex image-side surface, a fifth lens 325 that has a negative refractive power and has a convex image-side surface, and an imaging plane formed by the lens system 320 on a surface of a photoreceptor 310 are arranged in an optic axis AX of the image photographing apparatus 30 from an object side to an image side (from left to right in FIG. 4). In some embodiments, a light filter 340 is included between the fifth lens 325 and the photoreceptor 310. The first lens 321 has the positive refractive power and has the convex object-side surface, and the first lens 321 has a function of converging light rays. The second lens 322 has the negative refractive power, the convex image-side surface, and the concave object-side surface, and the second lens 322 has a function of correcting a color difference caused by light rays that have different wavelengths and that enter the lens system. The third lens 323 has the negative refractive power and has the concave image-side surface, and the third lens 323 has a function of expanding light rays. The fourth lens 324 has the positive refractive power and has the convex image-side surface, and the fourth lens 324 has a function of re-correcting the color difference caused by the light rays that have different wavelengths and that enter the lens system. Compared with the lens system shown in FIG. 2, a curvature radius of an edge region and a curvature radius of a non-edge region on the object-side surface of the second lens 322 in this embodiment are different, and the curvature radius of the edge region on the object-side surface of the second lens is positive, that is, an edge of the object-side surface of the second lens 322 bends to the object side. A function of the second lens 322 is to correct a field curvature and a distortion of light rays that enter the lens system.

The first lens 321 has a convex object-side surface or a flat object-side surface, and has a positive focal length. The first lens 321 satisfies the following conditions: $0.3<f1/f<0.6$, and $-1.0<R1/R2<0$, where f1 indicates the focal length of the first lens, R1 indicates a vertex curvature radius of the object-side surface of the first lens, and R2 indicates a vertex curvature radius of an image-side surface of the first lens.

The second lens 322, the third lens 323, and the fifth lens 325 have negative focal lengths, and satisfy the following conditions: $-0.8<f2/f<-0.1$, and $-100<R3/R4<100$;
$-0.8<f3/f<-0.1$, and $-100<R5/R6<100$; and
$-0.8<f5/f<-0.1$, and $-0.1<R9/R10<10$, where f2 indicates the focal length of the second lens, f3 indicates the focal length of the third lens, f5 indicates the focal length of the fifth lens, R3 indicates a vertex curvature radius of the object-side surface of the second lens, R4 indicates a vertex curvature radius of the image-side surface of the second lens, R5 indicates a vertex curvature radius of an object-side surface of the third lens, R6 indicates a vertex curvature radius of the image-side surface of the third lens, R9 indicates a vertex curvature radius of an object-side surface of the fifth lens, and R10 indicates a vertex curvature radius of the image-side surface of the fifth lens.

The fourth lens 324 has a positive focal length, and satisfies the following conditions:
$0.4<f4/f<2.0$, and $0<R7/R8<20$, where f4 indicates the focal length of the fourth lens, R7 indicates a vertex curvature radius of an object-side surface of the fourth lens, and R8 indicates a vertex curvature radius of the image-side surface of the fourth lens.

In addition, the third lens and the fifth lens are made of materials having a first abbe coefficient, and the first lens, the second lens, and the fifth lens are made of materials having a second abbe coefficient. The foregoing materials may be transparent materials such as plastics or glass.

Table 2A to Table 2C provide example values of various optical and physical parameters of example embodiments of the image photographing apparatus 30 and the lens system 320 shown in FIG. 4. Referring to Table 2A to Table 2C, embodiments of the lens system 320 cover applications in a visible light region of an optical spectrum from 470 nm to 650 nm.

Table 2A shows basic parameters of the lens system 320. Table 2B shows basic parameters of each component in the lens system 320. Table 2C shows curvature radii and aspheric coefficients of surfaces of all the lenses in the lens system 320. Surfaces S0 to S14 in Table 2B and Table 2C respectively indicate: an object plane S0, an aperture grating S1, the object-side surface S2 of the first lens, the image-side surface S3 of the first lens, the object-side surface S4 of the second lens, the image-side surface S5 of the second lens, the object-side surface S6 of the third lens, the image-side surface S7 of the third lens, the object-side surface S8 of the fourth lens, the image-side surface S9 of the fourth lens, the object-side surface S10 of the fifth lens, the image-side surface S11 of the fifth lens, an object-side surface S12 of the light filter, an image-side surface S13 of the light filter, and the imaging plane S14. Table 1B includes the following parameters of all the components: curvature radii R (which may be specific values or may be INF), shapes (flat and ASP), thicknesses or intervals, refractive indexes Nd, and abbe numbers Vd. Table 2C includes curvature radii R and aspheric coefficients K, A, B, C, and D of the surfaces of the lenses.

Figure 5:
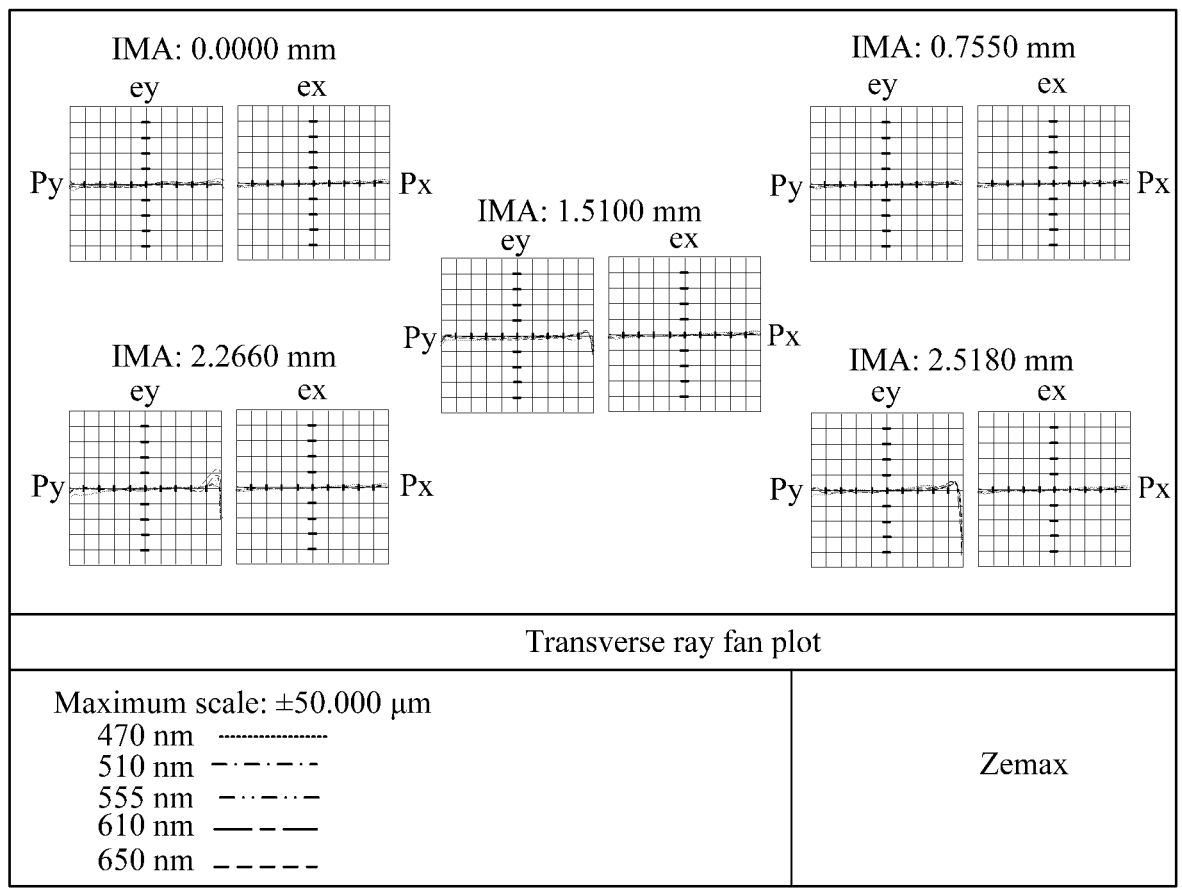
FIG. 5 is a line graph of polychromatic light ray aberrations, of a lens system shown in FIG. 4, in a half field of view and in a visible spectral band with a range from 470 nm to 650 nm.

The lens system 320 and the parameters provided in Table 2A to Table 2C can effectively correct optical aberrations. FIG. 5 shows a line graph of polychromatic light ray aberrations, of the lens system 320 described in FIG. 4 and Table 2A to Table 2C, in a half field of view (HFOV, 12.5 degrees) and in a visible spectral band with a range from 470 nm to 650 nm. FIG. 5 is a transverse ray fan plot output by using Zemax emulation, and shows curves of polychromatic light ray aberrations, where Px/Py indicates a normalized coordinate of a pupil, ex/ey indicates a position difference of a light ray on an imaging plane, and a maximum/minimum value of ex/ey is (Maximum scale+/−50 μm). FIG. 5 separately shows aberration curves of light rays of five wavelengths (470 nm, 510 nm, 555 nm, 610 nm, and 610 nm) respectively on IMAs (imaging plane)=0.0000 mm, 0.7550 mm, 1.5100 mm, 2.2650 mm, and 2.5180 mm. A smaller position difference on the imaging plane ex/ey indicates better optical performance of the lens system. In the lens system provided in this application, the position difference on the imaging plane ex/ey is controlled within 10 μm.

The aspheric coefficients of the lens surfaces in the lens system in the example are listed in Table 2C. The TTL of the lens system can be reduced to 10.2 mm by configuring the lens system based on distribution of the refractive powers of the lenses, and by adjusting the curvature radii and the aspheric coefficients based on the parameters described in Table 2A to Table 2C. Moreover, a surface that is of the fifth lens and that bulges towards the image side diffuses light rays to the imaging surface. Compared with that in prior approaches, the lens system in this application can effectively reduce height and width sizes of the lens system by 30%, and can effectively correct aberrations of the system. An aberration curve shows that the lens system can obtain optical performance of high image quality resolution.

In an example in FIG. 6, a sectional view of an image photographing apparatus 40 including a lens system 420 is provided. The lens system 420 includes five lens elements (421 to 425) that have refractive powers. In FIG. 6, a first lens 421 that has a positive refractive power and has a convex object-side surface, an aperture stop 430, a second lens 422 that has a negative refractive power and has a convex image-side surface, a third lens 423 that has a negative refractive power and has a concave image-side surface, a fourth lens 424 that has a positive refractive power and has a convex image-side surface, a fifth lens 425 that has a negative refractive power and has a convex image-side surface, and an imaging plane formed by the lens system 420 on a surface of an photoreceptor 410 are arranged in an optic axis AX of the image photographing apparatus 40 from an object side to an image side (from left to right in FIG. 6). In some embodiments, a light filter 440 is included between the

TABLE 2A

| | |
|---|---|
| Focal length | 12 mm |
| F value | 2.8 |
| Half FOV | 12.5° |
| Total track length TTL | 10.2 mm |
| Telephoto ratio TTL/f | 0.85 |
| Designed wavelength | 650 nm, 610 nm, 555 nm, 510 nm, 470 nm |

TABLE 2B

| Element | Surface (S#) | Radius R | Shape | Thickness or interval | Material | Refractive index Nd | Abbe number Vd |
|---|---|---|---|---|---|---|---|
| Object plane | 0 | INF | Flat | INF | | | |
| Aperture grating | 1 | INF | Flat | −0.85 | | | |
| L1 | 2 | 3.0 | ASP | 1.425 | Plastic | 1.5445 | 55.987 |
| | 3 | −11.7 | ASP | 0.36 | | | |
| L2 | 4 | −4.7 | ASP | 0.286 | Plastic | 1.651 | 21.514 |
| | 5 | −34.6 | ASP | 2.533 | | | |
| L3 | 6 | −7.1 | ASP | 0.283 | Plastic | 1.5445 | 55.987 |
| | 7 | 17.2 | ASP | 1.110 | | | |
| L4 | 8 | −8.3 | ASP | 0.603 | Plastic | 1.651 | 21.514 |
| | 9 | −4.4 | ASP | 0.08 | | | |
| L5 | 10 | −4.0 | ASP | 0.625 | Plastic | 1.5445 | 55.987 |
| | 11 | −7.8 | ASP | 0.1 | | | |
| IR filter | 12 | INF | Flat | 0.21 | Glass | | |
| | 13 | INF | Flat | 2.838 | | | |
| Imaging plane | 14 | INF | Flat | | | | |

TABLE 2C

| S# | Radius (R) | K | A | B | C | D |
|---|---|---|---|---|---|---|
| 2 | 3.0 | −0.3 | 0.000993137 | 0.000104489 | −2.13E−06 | 5.44E−06 |
| 3 | −11.7 | −102.7 | −0.004692414 | 0.00246951 | −0.000424979 | 2.68E−05 |
| 4 | −4.7 | −20.8 | 0.009611831 | 0.001051761 | −0.000715842 | 7.75E−05 |
| 5 | −34.6 | −102.1 | 0.028753705 | −0.003457705 | 1.70E−05 | 4.73E−05 |
| 6 | −7.1 | −79.6 | 0.020393488 | −0.004853456 | 0.001376429 | −0.000923727 |
| 7 | 17.2 | 100.5 | 0.0561219 | −0.013692436 | 0.006741178 | −0.001712769 |
| 8 | −8.3 | −4.2 | −0.015564728 | 0.000218977 | −0.002851476 | 0.000731513 |
| 9 | −4.4 | 1.1 | −0.008043878 | 6.38E−05 | −0.000754818 | 0.000205943 |
| 10 | −4.0 | −6.3 | −0.025128217 | 0.006629851 | 0.00012987 | −7.09E−05 |
| 11 | −7.8 | −18.1 | −0.024097108 | 0.004151367 | −0.000594114 | 3.96E−05 | fifth lens 425 and the photoreceptor 410. The first lens 421 has the positive refractive power and has the convex object-side surface, and the first lens 421 has a function of converging light rays. The second lens 422 has the negative refractive power and has the concave image-side surface, and the second lens 422 has a function of correcting a color difference caused by light rays that have different wavelengths and that enter the lens system. The third lens 423 has the negative refractive power and has the concave image-side surface, and the third lens 423 has a function of expanding light rays. The fourth lens 424 has the positive refractive power and has the convex image-side surface, and the fourth lens 424 has a function of re-correcting the color difference caused by the light rays that have different wavelengths and that enter the lens system. A difference from the foregoing examples provided in FIG. 2 and FIG. 4 lies in that a curvature radius of an edge region and a curvature radius of a non-edge region on the image-side surface of the third lens 423 are different, and the curvature radius of the edge region on the image-side surface of the third lens 423 is negative. A function of the third lens 423 is to correct a field curvature and a distortion of light rays that enter the lens system.

The first lens 421 has a convex object-side surface or a flat object-side surface and has a positive focal length, and the first lens satisfies the following conditions:

0.3<f1/f<0.6, and −1.0<R1/R2<0, where f1 indicates the focal length of the first lens, R1 indicates a vertex curvature radius of the object-side surface of the first lens, and R2 indicates a vertex curvature radius of an image-side surface of the first lens;

the second lens 422, the third lens 423, and the fifth lens 425 have negative focal lengths, and satisfy the following conditions:

−0.8<f2/f<−0.1, and −100<R3/R4<100;
−0.8<f3/f<−0.1, and −100<R5/R6<100; and
−0.8<f5/f<−0.1, and −0.1<R9/R10<10, where f2 indicates the focal length of the second lens, f3 indicates the focal length of the third lens, f5 indicates the focal length of the fifth lens, R3 indicates a vertex curvature radius of an object-side surface of the second lens, R4 indicates a vertex curvature radius of the image-side surface of the second lens, R5 indicates a vertex curvature radius of an object-side surface of the third lens, R6 indicates a vertex curvature radius of the image-side surface of the third lens, R9 indicates a vertex curvature radius of an object-side surface of the fifth lens, and R10 indicates a vertex curvature radius of the image-side surface of the fifth lens.

The fourth lens 424 has a positive focal length, and satisfies the following conditions:

0.4<f4/f<0.8, and 0<R 7/R 8<20, where f4 indicates the focal length of the fourth lens, R7 indicates a vertex curvature radius of an object-side surface of the fourth lens, and R8 indicates a vertex curvature radius of the image-side surface of the fourth lens.

In addition, the first lens and the third lens are made of materials having a first abbe coefficient, and the second lens, the fourth lens, and the fifth lens are made of materials having a second abbe coefficient. The foregoing materials may be transparent materials such as plastics or glass.

Table 3A to Table 3C provide example values of various optical and physical parameters of example embodiments of the image photographing apparatus 40 and the lens system 420 shown in FIG. 6. Referring to Table 3A to Table 3C, embodiments of the lens system 420 cover applications in a visible light region of an optical spectrum from 470 nm to 650 nm.

Table 3A shows basic parameters of the lens system 420. Table 3B shows basic parameters of each component in the lens system 420. Table 3C shows curvature radii and aspheric coefficients of the surfaces of all the lenses in the lens system 420. Surfaces S0 to S14 in Table 3B and Table 3C respectively indicate: an object plane S0, an aperture grating S1, the object-side surface S2 of the first lens, the image-side surface S3 of the first lens, the object-side surface S4 of the second lens, the image-side surface S5 of the second lens, the object-side surface S6 of the third lens, the image-side surface S7 of the third lens, the object-side surface S8 of the fourth lens, the image-side surface S9 of the fourth lens, the object-side surface S10 of the fifth lens, the image-side surface S11 of the fifth lens, an object-side surface S12 of the light filter, an image-side surface S13 of the light filter, and the imaging plane S14. Table 3B includes the following parameters of all the components: curvature radii R (which may be specific values or may be INF), shapes (flat and ASP), thicknesses or intervals, refractive indexes Nd, and abbe numbers Vd. Table 3C includes curvature radii R and aspheric coefficients K, A, B, C, and D of the surfaces of the lenses.

Figure 7:
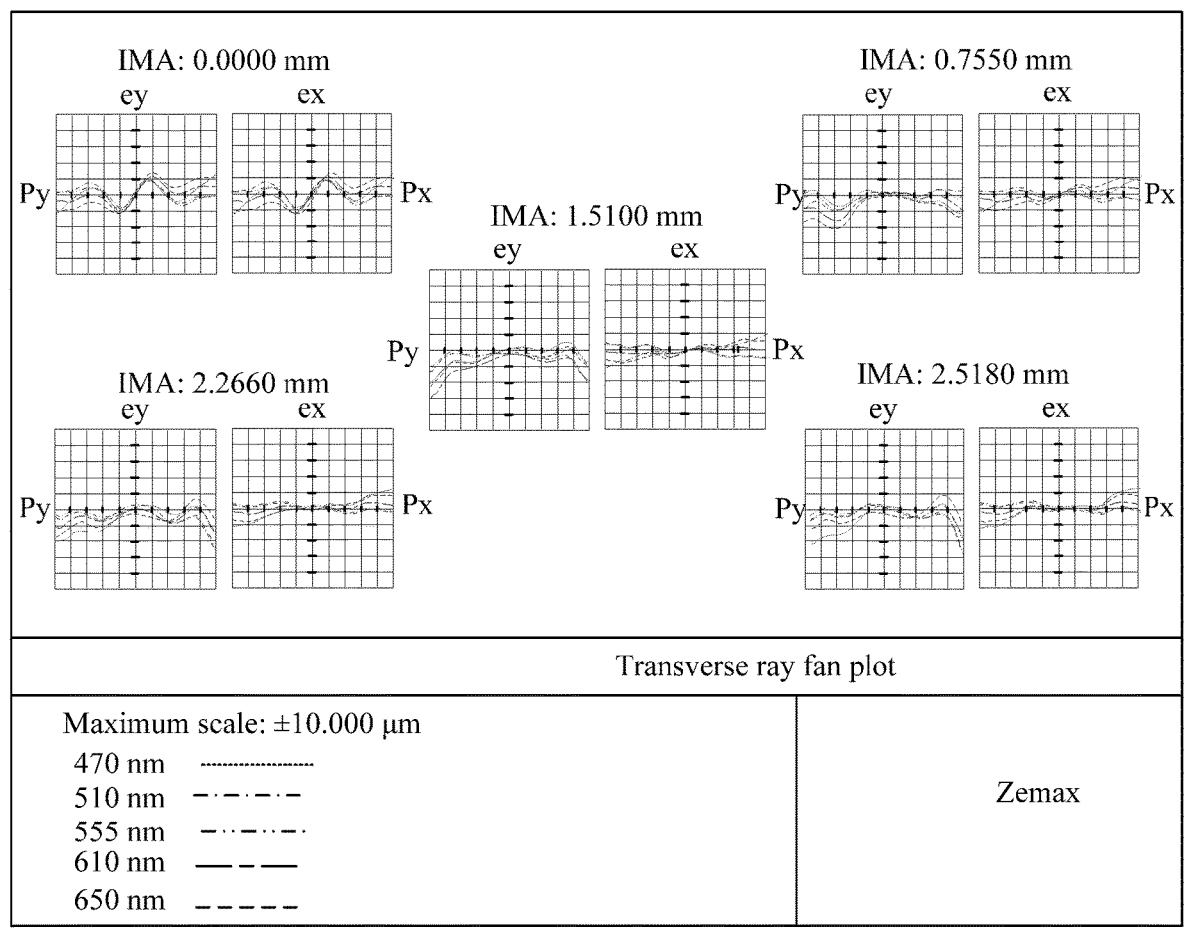
FIG. 7 is a line graph of polychromatic light ray aberrations, of a lens system shown in FIG. 6, in a half field of view and in a visible spectral band with a range from 470 nm to 650 nm.

The lens system 420 and the parameters provided in Table 3A to Table 3C can effectively correct optical aberrations. FIG. 7 shows a line graph of polychromatic light ray aberrations, of the lens system 420 described in FIG. 6 and Table 3A to Table 3C, in a half field of view (HFOV, 12.5 degrees) and in a visible spectral band with a range from 470 nm to 650 nm. FIG. 7 is a transverse ray fan plot output by using Zemax emulation, and shows curves of polychromatic light ray aberrations, where Px/Py indicates a normalized coordinate of a pupil, ex/ey indicates a position difference of a light ray on an imaging plane, and a maximum/minimum value of ex/ey is (Maximum scale +/−10 μm). FIG. 7 separately shows aberration curves of light rays of five wavelengths (470 nm, 510 nm, 555 nm, 610 nm, and 610 nm) respectively on IMAs (imaging plane)=0.0000 mm, 0.7550 mm, 1.5100 mm, 2.2650 mm, and 2.5180 mm. A smaller position difference on the imaging plane ex/ey indicates better optical performance of the lens system. In the lens system provided in this application, the position difference on the imaging plane ex/ey is controlled within 10 μm.

TABLE 3A

| | |
|---|---|
| Focal length | 12 mm |
| F Value | 2.6 |
| Half FOV | 12.5° |
| TTL | 10.56 mm |
| Telephoto ratio TTL/f | 0.88 |
| Designed wavelength | 650 nm, 610 nm, 555 nm, 510 nm, 470 nm |

TABLE 3B

| Element | Surface (S#) | Curvature radius R | Shape | Thickness or interval | Material | Refractive index Nd | Abbe number Vd |
|---|---|---|---|---|---|---|---|
| Object plane | 0 | INF | Flat | INF | | | |
| Aperture grating | 1 | 2.8 | ASP | 1.613 | Plastic | 1.5445 | 55.987 |
| First lens | 2 | −41.5 | ASP | 0.067 | | | |
| | 3 | INF | Flat | 0.008 | | | |
| Second lens | 4 | −17.7 | ASP | 0.515 | Plastic | 1.651 | 21.514 |
| | 5 | 9.0 | ASP | 2.5 | | | |
| Third lens | 6 | −6.6 | ASP | 0.36 | Plastic | 1.5445 | 55.987 |
| | 7 | 11.9 | ASP | 0.39 | | | |
| Fourth lens | 8 | −8.7 | ASP | 0.593 | Plastic | 1.651 | 21.514 |
| | 9 | −2.0 | ASP | 0.08 | | | |
| Fifth lens | 10 | −3.2 | ASP | 0.43 | Plastic | 1.651 | 21.514 |
| | 11 | 135.2 | ASP | 0.1 | | | |
| Light filter | 12 | INF | Flat | 0.21 | Glass | | |
| | 13 | INF | Flat | 3.695 | | | |
| Imaging plane | 14 | INF | Flat | | | | |

TABLE 3C

| S# | Radius (R) | K | A | B | C | D |
|---|---|---|---|---|---|---|
| 1 | 2.8 | 0 | −0.000574427 | −0.000243979 | 3.54658E−05 | −8.18527E−06 |
| 2 | −41.5 | 44.5 | 0.005831937 | −0.000978298 | 9.87712E−05 | −2.38114E−06 |
| 4 | −17.7 | −50 | 0.015350199 | −0.002410659 | 0.000283762 | −1.57849E−05 |
| 5 | 9.0 | 6.6 | 0.015251701 | −0.000791959 | 0.000105969 | −2.35171E−06 |
| 6 | −6.6 | 0 | −0.033669898 | 0.016034675 | −0.004244819 | −7.31518E−05 |
| 7 | 11.9 | −27.7 | −0.045992958 | 0.021789416 | −0.005868875 | 0.000259272 |
| 8 | −8.7 | 0 | −0.001166067 | −0.002669207 | −0.005476305 | 0.001047399 |
| 9 | −2.0 | −12.0 | 0.047955704 | −0.044193753 | 0.009228998 | −0.000568143 |
| 10 | −3.2 | −47.5 | 0.025097357 | −0.052386814 | 0.017013324 | −0.001931891 |
| 11 | 135.2 | 46.0 | −0.040295209 | 0.001591664 | 0.000854581 | −0.000168104 |

The aspheric coefficients of the lens surfaces in the lens system in the example are listed in Table 3C. Aberrations of the system can be effectively corrected by configuring the lens system based on distribution of the refractive powers of the lenses, and by adjusting the curvature radii and the aspheric coefficients based on the parameters described in Table 3A to Table 3C. An aberration curve shows that the lens system can obtain optical performance of high image quality resolution. Moreover, a surface that is of the fifth lens and that bulges towards the image side diffuses light rays to the imaging surface. Compared with that in prior approaches, the lens system in this application can effectively reduce height and width sizes of the lens system by 30%.

Figure 8:
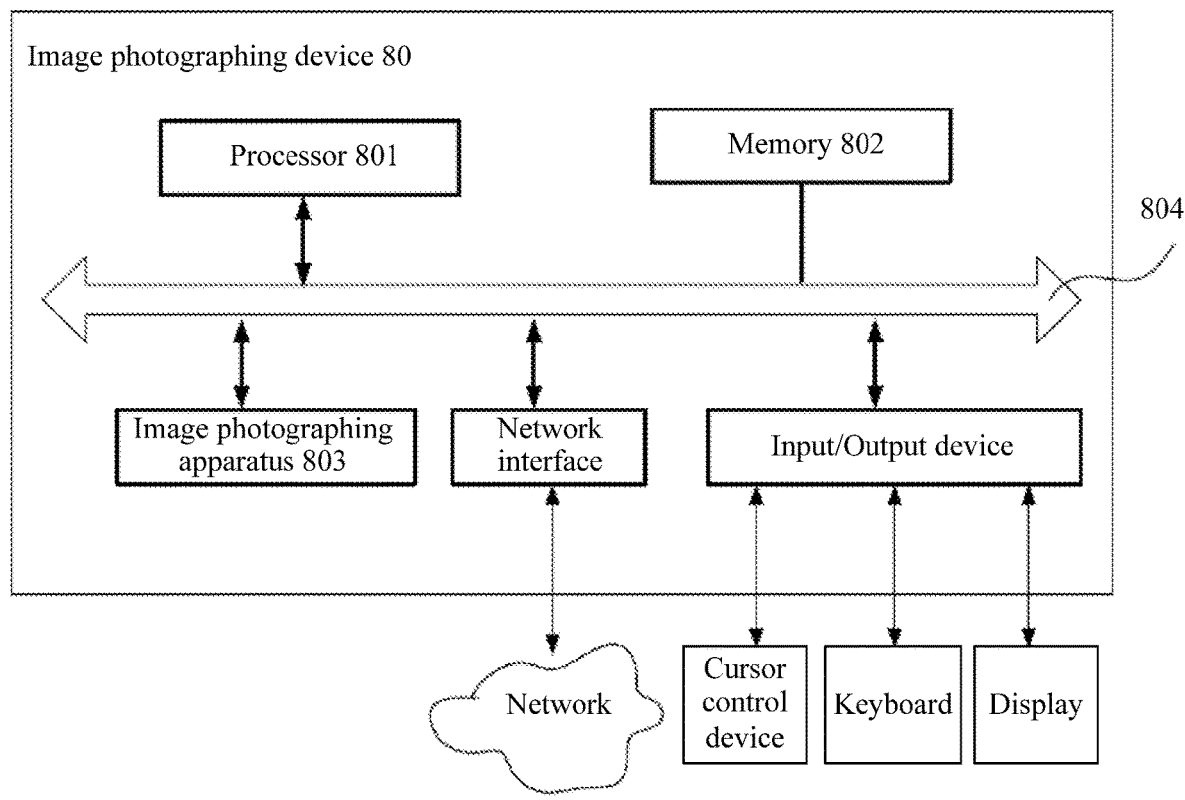
FIG. 8 is a schematic structural diagram of an image photographing device according to an embodiment of this application.

Referring to FIG. 8, an embodiment of this application provides an image photographing device 80 that includes the image photographing apparatus provided in the foregoing embodiments. In addition, the image photographing device 80 may be configured to control the image photographing apparatus and/or be configured to implement a method for processing an image captured by using the image photographing apparatus. In different embodiments, the image photographing device 80 may be any one of various types of devices, including but not limited to a personal computer system, a desktop computer, a palmtop computer, a notebook computer, a tablet computer, a netbook computer, a mainframe computer system, a handheld computer, a workstation, a network computer, a camera, a set top box, a mobile device, a radio telephone, a smartphone, a consumption device, a video game console, a handheld video game device, an application server, a storage device, a television, a video recording device, or a peripheral device such as a switch, a modem, or a router, or generally any type of computing or electronic device.

As shown in FIG. 8, the image photographing device 80 includes a processor 801, a memory 802, and an image photographing apparatus 803. The processor 801, the memory 802, and the image photographing apparatus 803 are coupled and connected through a bus 804. The memory 802 includes an instruction that can be executed by the processor 801 to control an operation of the image photographing apparatus 803. The image photographing apparatus 803 is any one of the foregoing image photographing apparatuses.

The image photographing device 80 may include one or more processors 801. The processor 801 may be a general purpose central processing unit (CPU), a microprocessor, an application-specific integrated circuit (ASIC), or one or more integrated circuits for controlling execution of a program of the solutions in this application.

The memory 802 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blue-ray disc, or the like), a magnetic disk storage medium or another magnetic storage device, or any other medium that can be configured to carry or store expected program code in a form of an instruction or a data structure and that can be accessed by a computer. However, the memory 802 is not limited thereto. The memory may exist independently, and be connected to the processor through the bus. Alternatively, the memory may be integrated with the processor.

The memory 802 is configured to store application program code for controlling of the image photographing device 80 provided in this application and/or application program code for performing an operation on an image obtained by the image photographing device 80 provided in this application. Execution of the controlling and the operation is controlled by the processor 801.

In the embodiment shown in FIG. 8, the image photographing device 80 further includes a network interface coupled to the bus 804, and one or more input/output devices, such as a cursor control device, a keyboard, and (one or more) displays. The network interface may be configured to allow data exchange between the image photographing device 80 and another device attached to a network (for example, a carrier or a proxy device). In various embodiments, the network may include one or more networks, including but not limited to a local area network (LAN) (for example, an Ethernet network or a company network), a wide area network (WAN) (for example, the Internet), a wireless data network, some other electronic data networks, or a combination thereof. In various embodiments, the network interface may support communication implemented through the following networks: a wired or wireless general data network, for example, any proper type of Ethernet network; a telecom/telephone network, such as an analog voice network or a digital fiber communications network; a storage area network (SAN), such as a fiber channel SAN; or any other proper type of network and/or protocol. In some embodiments, the input/output device may include one or more display terminals, a keyboard, a keypad, a touchpad, a scanning device, a speech recognition device or an optical recognition device, or any other device suitable for inputting or accessing data by using the image photographing device 80. A plurality of input/output devices may exist in the image photographing device 80, or may be distributed on various nodes of the image photographing device 80.

The term "one embodiment" or "an embodiment" is mentioned in this application, and occurrence of the term "in one embodiment" or "in an embodiment" does not necessarily refer to a same embodiment. Particular features, structures, or characteristics may be combined in any proper manner that meets this disclosure. The term "include"/ "comprise" is open. When used in the claims, this term does not exclude additional structures or steps.

When terms such as "first" and "second" are used in this specification, these terms are used as labels of nouns subsequent to these terms, and do not mean any type of sequence (for example, a spatial, time, or logical sequence). For example, the first lens and the second lens in this specification are merely intended to distinguish between individuals, and do not indicate a special position relationship between the lenses. For example, first and second do not necessarily mean that the first lens needs to be on a left side or a right side of the second lens.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A lens system, comprising:
a first lens, a second lens, a third lens, a fourth lens, and a fifth lens that are sequentially arranged in an optic axis direction from an object side to an image side, wherein the first lens has a positive refractive power, the second lens has a negative refractive power, the third lens has a negative refractive power, the fourth lens has a positive refractive power, and the fifth lens has a negative refractive power and has a convex image-side surface, wherein:
the first lens has a convex object-side surface,
the second lens has a convex image-side surface and has a concave object-side surface,
the third lens has a concave image-side surface, and
the fourth lens has a convex image-side surface.

2. The lens system according to claim 1, wherein the lens system has an effective focal length (f) within a range from 11.0 millimeters (mm) to 13.00 mm, the lens system has a total track length (TTL) within a range from 8.0 mm to 12.00 mm, and the lens system has a telephoto ratio (TTL/f) within a range from 0.74 to 1.0.

3. The lens system according to claim 1, wherein a curvature radius of an edge region and a curvature radius of a non-edge region on the object-side surface of the second lens are different, and the curvature radius of the edge region on the object-side surface of the second lens is negative.

4. The lens system according to claim 1, wherein a curvature radius of an edge region and a curvature radius of a non-edge region on the object-side surface of the second lens are different, and the curvature radius of the edge region on the object-side surface of the second lens is positive.

5. The lens system according to claim 1, wherein the third lens and the fifth lens are made of materials having a first abbe coefficient, and the first lens, the second lens, and the fourth lens are made of materials having a second abbe coefficient.

6. The lens system according to claim 1, wherein
the first lens has a positive focal length, and the first lens satisfies the following conditions:
$0.3 < f1/f < 0.6$, and $-1.0 < R1/R2 < 0$, wherein f1 indicates the focal length of the first lens, R1 indicates a vertex curvature radius of the object-side surface of the first lens, and R2 indicates a vertex curvature radius of an image-side surface of the first lens;
the second lens, the third lens, and the fifth lens have negative focal lengths, and satisfy the following conditions:
$-0.8 < f2/f < -0.1$, and $-100 < R3/R4 < 100$;
$-0.8 < f3/f < -0.1$, and $-100 < R5/R6 < 100$; and
$-0.8 < f5/f < -0.1$, and $-0.1 < R9/R10 < 10$,
wherein f2 indicates a focal length of the second lens, f3 indicates a focal length of the third lens, f5 indicates a focal length of the fifth lens, R3 indicates a vertex curvature radius of an object-side surface of the second lens, R4 indicates a vertex curvature radius of an image-side surface of the second lens, R5 indicates a vertex curvature radius of an object-side surface of the third lens, R6 indicates a vertex curvature radius of an image-side surface of the third lens, R9 indicates a vertex curvature radius of an object-side surface of the fifth lens, and R10 indicates a vertex curvature radius of an image-side surface of the fifth lens; and the fourth lens has a positive focal length, and satisfies the following conditions:

0.4<f4/f<2.0, and O<R7/R8<20, wherein f4 indicates the focal length of the fourth lens, R7 indicates a vertex curvature radius of an object-side surface of the fourth lens, and R8 indicates a vertex curvature radius of an image-side surface of the fourth lens.

7. The lens system according to claim 1, wherein a field of view of the lens system is less than or equal to 25°.

8. An image photographing apparatus, comprising:

a photoreceptor, configured to capture light projected onto a surface of the photoreceptor; and a lens system, configured to refract light that comes from an object field located in front of the image photographing apparatus, to form an image of a scene on an imaging plane that is located on the surface of the photoreceptor, wherein the lens system comprises a first lens, a second lens, a third lens, a fourth lens, and a fifth lens that are sequentially arranged in an optic axis direction from an object side to an image side, wherein the first lens has a positive refractive power, the second lens has a negative refractive power, the third lens has a negative refractive power, the fourth lens has a positive refractive power, and the fifth lens has a negative refractive power and has a convex image-side surface, and wherein the first lens has a convex object-side surface, the second lens has a convex image-side surface and has a concave object-side surface, the third lens has a concave image-side surface, and the fourth lens has a convex image-side surface.

9. The image photographing apparatus according to claim 8, wherein the image photographing apparatus further comprises an aperture stop on an object side of a first lens located on an object side on an optic axis of the lens system, or the image photographing apparatus further comprises an aperture stop between the first lens and the second lens that are located on an object side on an optic axis of the lens system.

10. The image photographing apparatus according to claim 9, wherein the aperture stop provides a focal ratio within a range from 2.4 to 10 after being adjusted.

11. The image photographing apparatus according to claim 8, wherein the image photographing apparatus further comprises a light filter on an image side of the first lens located on an image side on an optic axis of the lens system.

12. An image photographing device, comprising:

a processor, a memory, and an image photographing apparatus, wherein the processor, the memory, and the image photographing apparatus are coupled and connected through a bus;

the memory comprises one or more instructions that are executed by the processor to control an operation of the image photographing apparatus; and wherein the image photographing apparatus further comprises a photoreceptor and a lens system, wherein the photoreceptor is configured to capture light projected onto a surface of the photoreceptor, and the lens system is configured to refract light that comes from an object field located in front of the image photographing apparatus, to form an image of a scene on an imaging plane that is located on the surface of the photoreceptor, wherein the lens system comprises a first lens, a second lens, a third lens, a fourth lens, and a fifth lens that are sequentially arranged in an optic axis direction from an object side to an image side, wherein the first lens has a positive refractive power, the second lens has a negative refractive power, the third lens has a negative refractive power, the fourth lens has a positive refractive power, and the fifth lens has a negative refractive power and has a convex image-side surface, and wherein the first lens has a convex object-side surface, the second lens has a convex image-side surface and has a concave object-side surface, the third lens has a concave image-side surface, and the fourth lens has a convex image-side surface.

* * * * *